United States Patent
Zhao et al.

(10) Patent No.: US 12,387,466 B2
(45) Date of Patent: Aug. 12, 2025

(54) NOISE REDUCTION AUTO-ENCODER-BASED ANOMALY DETECTION MODEL TRAINING METHOD

(71) Applicant: INSPUR SUZHOU INTELLIGENT TECHNOLOGY CO., LTD., Jiangsu (CN)

(72) Inventors: Bing Zhao, Jiangsu (CN); Feng Li, Jiangsu (CN); Qing Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 201 days.

(21) Appl. No.: 18/039,269

(22) PCT Filed: Dec. 30, 2021

(86) PCT No.: PCT/CN2021/143269
§ 371 (c)(1),
(2) Date: May 29, 2023

(87) PCT Pub. No.: WO2022/148301
PCT Pub. Date: Jul. 14, 2022

(65) Prior Publication Data
US 2024/0303971 A1    Sep. 12, 2024

(30) Foreign Application Priority Data
Jan. 7, 2021    (CN) .......................... 202110019464.7

(51) Int. Cl.
*G06V 10/774*    (2022.01)
*G06V 10/30*    (2022.01)
*G06V 10/98*    (2022.01)

(52) U.S. Cl.
CPC ............ *G06V 10/774* (2022.01); *G06V 10/30* (2022.01); *G06V 10/993* (2022.01)

(58) Field of Classification Search
CPC ..... G06V 10/774; G06V 10/30; G06V 10/993
See application file for complete search history.

(56) References Cited

U.S. PATENT DOCUMENTS 10,262,236 B2 *  4/2019  Lim .................... G06F 18/28
12,323,593 B2 *  6/2025  Besenbruch .......... H04N 19/13
(Continued)

FOREIGN PATENT DOCUMENTS

AU    2011265381 A1    7/2013
CN    105205453 A      12/2015
(Continued)

OTHER PUBLICATIONS

Zhao, Chunhui, Xueyuan Li, and Haifeng Zhu. "Hyperspectral anomaly detection based on stacked denoising autoencoders." Journal of Applied Remote Sensing 11.4 (2017): 042605-042605. (Year: 2017).*

*Primary Examiner* — Utpal D Shah
(74) *Attorney, Agent, or Firm* — IPro, PLLC

(57) ABSTRACT

Disclosed is a method for training an abnormal-detection model based on an improved denoising autoencoder, including: acquiring an original image; generating a rectangular frame according to a preset range of a resolution ratio, by the improved denoising autoencoder, and occluding the original image by the rectangular frame, wherein the resolution ratio is a ratio of a resolution of an occlusion area formed by the rectangular frame to a resolution of the original image; filling random noise in the rectangular frame to obtain a noised image, by the improved denoising autoencoder; and performing constraint learning on the original image and the noised image, by the abnormal-detection model, to implement training of the abnormal-detection model. Because a (Continued)

learning task is more complex, it is helpful to alleviate identity mapping, and detection performance of the model is improved. The present application further provides an apparatus, a device, and a readable storage medium thereof.

20 Claims, 2 Drawing Sheets

(56) References Cited

U.S. PATENT DOCUMENTS

| | | | | |
|---|---|---|---|---|
| 2018/0240219 A1* | 8/2018 | Mentl | ........................ | G06N 3/08 |
| 2020/0034948 A1* | 1/2020 | Park | ........................ | G06N 3/088 |
| 2023/0394718 A1* | 12/2023 | Stiebeiner | .................. | G06T 5/60 |

FOREIGN PATENT DOCUMENTS

| | | | |
|---|---|---|---|
| CN | 108520503 A | | 9/2018 |
| CN | 108961217 A | | 12/2018 |
| CN | 110738605 A | | 1/2020 |
| CN | 112734669 A | | 4/2021 |
| CN | 113487521 A | | 10/2021 |

* cited by examiner

NOISE REDUCTION AUTO-ENCODER-BASED ANOMALY DETECTION MODEL TRAINING METHOD

CROSS-REFERENCE TO RELATED APPLICATION

The present disclosure claims the priority of the Chinese patent application filed on Jan. 7, 2021 before the China National Intellectual Property Administration with the application number of CN202110019464.7 and the title of "IMPROVED NOISE REDUCTION AUTO-ENCODER-BASED ANOMALY DETECTION MODEL TRAINING METHOD", the entire content of which is incorporated herein by reference.

FIELD

The present application relates to the field of computer technology, and in particular, to a method for training an abnormal-detection model based on an improved denoising autoencoder, and an apparatus, a device and a readable storage medium thereof.

BACKGROUND

An abnormal-detection model is used to realize identification of abnormal data that does not conform to an expected pattern, and the abnormal data may be considered as uncommon data or data that is relatively different from other data. In a practical application, it is often impossible to obtain enough abnormal samples to participate in model training, so generally, it does not perform learning with respect to abnormal samples, but relies on learning with respect to normal samples, to make the abnormal-detection model to have an ability to distinguish the abnormal samples from the normal samples. From a learning principle, it may be considered that the abnormal-detection model looks for a corresponding pattern in a dataset of only the normal samples, and then effectively separates the normal samples from the abnormal samples in a larger space. The abnormal-detection model has been widely used in analyzing medical images, safety-surveillance images, and industrial-quality-inspection images.

SUMMARY

A purpose of this application is to provide a method for training an abnormal-detection model based on an improved denoising autoencoder, and an apparatus, a device and a readable storage medium thereof. The concrete solutions are as follows:

In a first aspect, the present application provides a method for training an abnormal-detection model based on an improved denoising autoencoder, including:

acquiring an original image;

generating a rectangular frame according to a preset range of a resolution ratio, by the improved denoising autoencoder, and occluding the original image by the rectangular frame, wherein the resolution ratio is a ratio of a resolution of an occlusion area formed by the rectangular frame to a resolution of the original image;

filling random noise in the rectangular frame to obtain a noised image, by the improved denoising autoencoder; and performing constraint learning on the original image and the noised image, by the abnormal-detection model, to implement training of the abnormal-detection model.

In an embodiment, the generating the rectangular frame according to the preset range of the resolution ratio, by the improved denoising autoencoder, includes:

randomly generating a target resolution ratio within the preset range of the resolution ratio; and generating the rectangular frame according to the target resolution ratio, by the denoising autoencoder.

In an embodiment, the generating the rectangular frame according to the preset range of the resolution ratio, by the improved denoising autoencoder, includes:

generating a random number of the rectangular frames according to the preset range of the resolution ratio, by the improved denoising autoencoder.

In an embodiment, the generating the rectangular frame according to the preset range of the resolution ratio, by the improved denoising autoencoder, includes:

within a preset range of a length-width ratio, randomly generating a target length-width ratio; and generating the rectangular frame whose length-width ratio is the target length-width ratio, according to the preset range of the resolution ratio, by the improved denoising autoencoder.

In an embodiment, the occluding the original image by the rectangular frame, includes:

randomly determining a position coordinate of the rectangular frame in the original image; and occluding the original image according to the position coordinate, by the rectangular frame.

In an embodiment, the filling the random noise in the rectangular frame by the improved denoising autoencoder, includes:

filling the random noise in the rectangular frame according to a preset probability density of the random noise, by the improved denoising autoencoder.

In an embodiment, the filling the random noise in the rectangular frame by the improved denoising autoencoder, includes:

filling the random noise in the rectangular frame by the improved denoising autoencoder, wherein the random noise includes any one item or more items of following: Gaussian noise, salt-and-pepper noise, Poisson noise, and Laplace noise.

In a second aspect, the present application provides an apparatus for training an abnormal-detection model based on an improved denoising autoencoder, including:

an image-acquisition module, configured to acquire an original image;

a rectangular-frame-generation module, configured to generate a rectangular frame according to a preset range of a resolution ratio, by the improved denoising autoencoder, and occlude the original image by the rectangular frame, wherein the resolution ratio is a ratio of a resolution of an occlusion area formed by the rectangular frame to a resolution of the original image;

a noise-filling module, configure to fill random noise in the rectangular frame by the improved denoising autoencoder, to obtain a noised image; and a constraint-learning module, configured to perform constraint learning on the original image and the noised image, by the abnormal-detection model, to implement training of the abnormal-detection model.

In a third aspect, the present application provides a device for training an abnormal-detection model based on an improved denoising autoencoder, including:

a storage, configured to store a computer program; and a processor, configured to execute the computer program, to implement the above-mentioned method for training the abnormal-detection model based on the improved denoising autoencoder.

In a fourth aspect, the present application provides a readable storage medium, on which a computer program is stored, wherein, in response to that the computer program is executed by a processor, the processor implements the above-mentioned method for training the abnormal-detection model based on the improved denoising autoencoder.

The present application provides a method for training an abnormal-detection model based on an improved denoising autoencoder, including: acquiring an original image; generating a rectangular frame according to a preset range of a resolution ratio, by the improved denoising autoencoder, and occluding the original image by the rectangular frame, wherein the resolution ratio is a ratio of a resolution of an occlusion area formed by the rectangular frame to a resolution of the original image; filling random noise in the rectangular frame to obtain a noised image, by the improved denoising autoencoder; and performing constraint learning on the original image and the noised image, by the abnormal-detection model, to implement training of the abnormal-detection model.

In addition, the present application further provides an apparatus for training an abnormal-detection model based on an improved denoising autoencoder, and a device and a readable storage medium thereof, technical effects of which correspond to those of the above method, and are not repeated here.

BRIEF DESCRIPTION OF THE DRAWINGS

In order to more clearly illustrate the technical solutions in the embodiments of the disclosure or in the prior art, following will briefly introduce the drawings needed to be used in illustrating the embodiments or the prior art. Apparently, the drawings in following description are merely some embodiments of the present application, and for those ordinary skilled in the field, they may further obtain other drawings according to the provided drawings without paying creative labor.

DETAILED DESCRIPTION OF THE EMBODIMENTS

Figure 1:
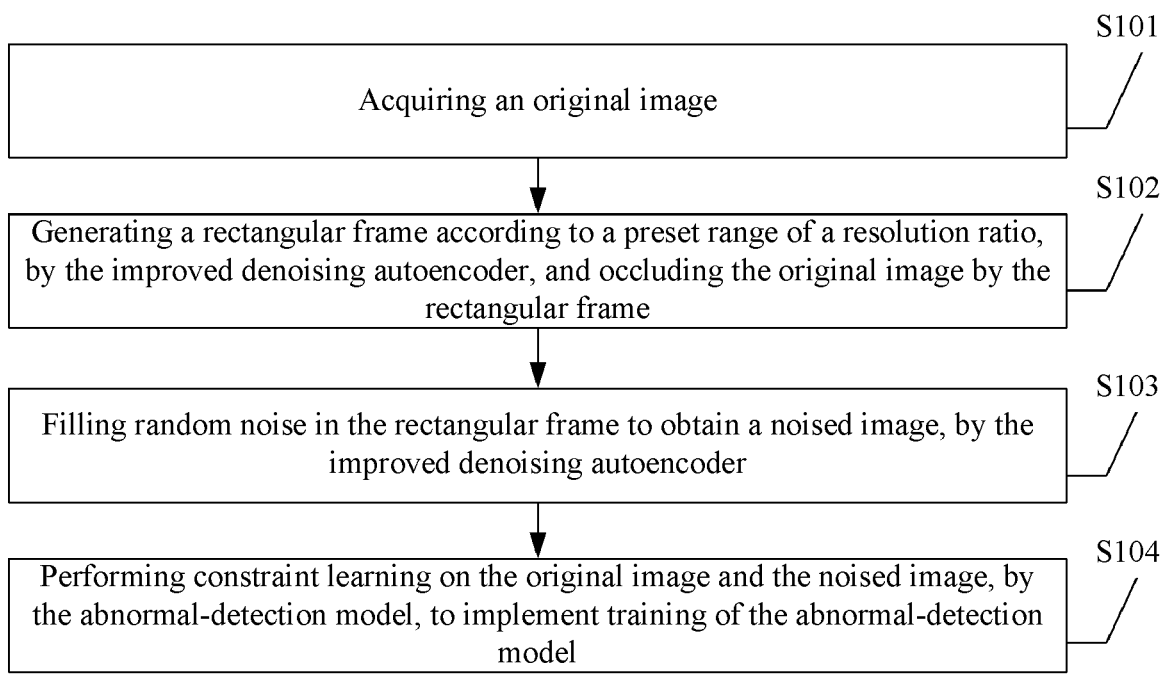
FIG. 1 is a flowchart of embodiment 1 of a method for training an abnormal-detection model based on an improved denoising autoencoder provided by the application.

In order to make those in the technical field to better understand technical solutions in the disclosure, the following will further describe the disclosure in detail in combination with the drawings and the embodiments. Apparently, the described embodiments are merely a part of the embodiments of the disclosure, not all of the embodiments. Based on the embodiments in the present disclosure, every other embodiment obtained by those ordinary skilled in the art without paying creative work, shall fall within a scope of protection of the present disclosure.

A mainstream idea for realizing an abnormal detection in deep-learning methods is a self-mapping method, a principle of which is to realize compression and reconstruction of the normal sample based on an autoencoder, and determine whether an image is normal or abnormal based on a difference between the image before the reconstruction and the image after the reconstruction. This type of method assumes that representations of the normal samples and the abnormal samples in a plurality of spaces are relatively different, and a model trained by using the normal samples is hard to reconstruct the abnormal samples well. However, the autoencoder has a problem of identity mapping, that is, it tends to output an input image as it is, so that, through the model, some abnormal samples that do not participate in training, may still obtain a relatively good reconstruction effect, which affects performance of the abnormal-detection model.

In order to solve the problem of identity mapping caused by usage of the autoencoder for the abnormal detection, a related solution uses the denoising autoencoder instead of the traditional autoencoder to conduct image-abnormal research. In a training process, the solution superimposes Gaussian noise on the input image, by the denoising autoencoder, and then performs constraint learning on an output image and a corresponding original image in which no noise is superimposed, such that the model may automatically remove the noise. This method may reduce the problem of identity mapping of the autoencoder to a certain extent, but, on the one hand, in a condition that only the Gaussian noise is superimposed, the model may learn this distribution pattern after a plurality of iterations; on the other hand, the Gaussian noise has the same effect on the normal samples and the abnormal samples, and has no distinguishing between graphic semantics thereof, so it has a limited effect for an abnormal-detection task, which may not improve performance of the abnormal detection.

A principle of the image reconstruction of a traditional denoising autoencoder is to apply the Gaussian noise to a full image of the original image. Because the Gaussian noise is relatively monotonous, which is easy to make the model to learn a noise distribution, and because the Gaussian noise has the same effect on normal images and abnormal images, it leads to a poor generalization ability of the model.

In view of this problem, a core of this application is to provide a method for training an abnormal-detection model based on an improved denoising autoencoder, and an apparatus, a device and a readable storage medium thereof, to improve the principle of the image reconstruction of the traditional denoising autoencoder, which applies a regularization effect on data from two aspects of a local occlusion and adding noise, and forces the model to more comprehensively learn global features of an image during training, such that it significantly improves performance of the abnormal detection of the model. That is to say, the disclosure is to solve a problem of weak performance of abnormal detection of models due to existence of identity mapping or a poor generalization ability in training solutions of current abnormal-detection models.

The following will introduce embodiment 1 of the method for training the abnormal-detection model based on the improved denoising autoencoder provided by the application. Referring to FIG. 1, the embodiment 1 includes following steps S101-S104.

S101. Acquiring an original image.

The above-mentioned original image is actually used as a training sample for the abnormal-detection model. A number of training samples in a practical application is huge. The embodiment takes a processing manner of a single image as an example, to illustrate a training process of the abnormal-detection model.

S102. Generating a rectangular frame according to a preset range of a resolution ratio, by the improved denoising autoencoder, and occluding the original image by the rectangular frame.

The embodiment presets the range of the resolution ratio, wherein the resolution ratio refers to a ratio of a display resolution of an occlusion area formed by the rectangular frame to a display resolution of the original image, or, in other words, a ratio of an area of the occlusion area formed by the rectangular frame to an area of the original image. By setting the range of the resolution ratio, a total area of the occlusion area may be set to be at a reasonable ratio, so as to prevent the rectangular frame from occluding too much part of the image to occlude too much main-body information of the image to affect a learning effect of the model. A concrete range of the resolution ratio may be adjusted according to actual application requirements, which is not limited by the embodiment.

In an actual training process, a generation process of the rectangular frame may be as follows: first, reading the preset range of the resolution ratio, and then randomly generating a target resolution ratio within the preset range of the resolution ratio; and finally generating the rectangular frame according to the target resolution ratio, by the denoising autoencoder, so as to ensure that the ratio of the resolution of the occlusion area formed by the generated rectangular frame to the resolution of the original image is the above target resolution ratio.

In order to increase randomness of the occlusion area and enhance the generalization ability of the model, a number of generated rectangular frames may be set to a random number under a premise of satisfying the aforementioned range of the resolution ratio. At this time, the generating process of the rectangular frame is as follows: generating the random number of the rectangular frames according to the preset range of the resolution ratio, by the improved denoising autoencoder.

On the above basis, in order to further enhance the randomness of the occlusion area, a range of a length-width ratio of the rectangular frame may be set, to make the length-width ratios of the rectangular frames generated during different generation processes of the rectangular frames are different, and even to make the length-width ratios of the respective rectangular frames generated during the same generation process of the rectangular frame are different. For example, the length-width ratios of the rectangular frames in the same generation process of the rectangular frame are the same, and the length-width ratios of the rectangular frames in different generation processes of the rectangular frames are different. At this time, the generation process of the rectangular frame is as follows: reading a preset range of the length-width ratio, and within the range of the length-width ratio, randomly generating a target length-width ratio; and generating the rectangular frame whose length-width ratio is the target length-width ratio, according to the preset range of the resolution ratio, by the improved denoising autoencoder.

In addition, the randomness of the occlusion area may be further enhanced by randomly determining an occlusion position of the rectangular frame. At this time, an occlusion process is as follows: randomly determining a position coordinate of the rectangular frame in the original image; and occluding the original image according to the position coordinate, by the rectangular frame.

The above has illustrated a random manner of the resolution ratio, a random manner of the number of the rectangular frames, a random manner of the length-width ratio of the rectangular frame, and a random manner of the occlusion position of the rectangular frame. A practical application may adopt any one random manner, or any more random manners, which is not limited by the embodiment.

Concretely, pixel points in the above-mentioned rectangular frame may be simply set to black, white or gray. Such setting is helpful for the model to perform learning with respect to other area except the occlusion area. Otherwise, the model tends to perform learning with respect to a special position of the image, which is easy to fall into a special mode.

S103. Filling random noise in the rectangular frame by the improved denoising autoencoder, to obtain a noised image.

Concretely, a probability density of the random noise may be set in advance, and then noise filling is performed according to the probability density. In the embodiment, the random noise includes any one item or more items of following: the Gaussian noise, salt-and-pepper noise, Poisson noise, and Laplace noise. In order to enhance the generalization ability of the model, in a practical application, a plurality of kinds of random noise may be superimposed. Applying the plurality of kinds of noise inside the rectangular frame may introduce more complex and comprehensive effects, and force the model to learn denoising processing for the plurality of kinds of noise during a learning process, which helps to improve the generalization ability of the model.

S104. Performing constraint learning on the original image and the noised image, by the abnormal-detection model, to implement training of the abnormal-detection model. The constraint learning is well known in prior art, which is not illustrated in detail.

It is worth mentioning that the original image selected in the embodiment may be the normal images or the abnormal images. Considering a problem that, in a practical application, it is often difficult to obtain the abnormal images, in the embodiment, the normal images are adopted to train the abnormal-detection model, and the training process at this time is semi-supervised training, which does not require complex manual annotation, thus saving time cost and labor cost, and improving efficiency of model training.

To sum up, for an abnormal-detection task, during testing, the traditional denoising autoencoder has a better reconstruction effect on the normal samples with added noise, and a poorer reconstruction effect on the abnormal samples with added noise. The embodiment improves a manner in which the denoising autoencoder applies the noise, to add the rectangular frame for the image to form a partial occlusion, and randomly add the noise in the rectangular frame. A purpose of doing so is that the rectangular frame acts as a local occlusion, which may force the model to more comprehensively learn global information of the image, rather than local information thereof. The noise is added randomly in the rectangular frame, which may make the model stereotypically learn a denoising method in a patterned way during the learning process, such that the denoising autoencoder may realize the better reconstruction effect for the abnormal images as well.

The following will introduce embodiment 2 of the method for training the abnormal-detection model based on the improved denoising autoencoder provided by the application in detail.

Figure 2:
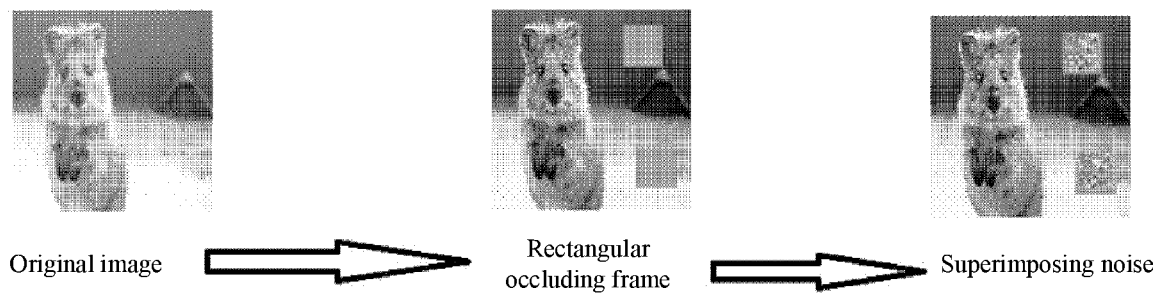
FIG. 2 is a schematic diagram of a process of embodiment 2 of the method for training the abnormal-detection model based on the improved denoising autoencoder provided by the application.

First, the original image is acquired, and then a series of rectangular frames are generated, to make a ratio of a sum of resolutions of all of the rectangular frames to the resolution of the original image fall within the preset range. In the embodiment, it is recommended to set the range to be 10%-20%. After that, any position of the original image is occluded, by the generated rectangular frames. As shown in FIG. 2, a leftmost of FIG. 2 is the original image, and a middle of FIG. 2 is an image after being occluded by the rectangular frames. Next, the respective rectangular frames are randomly superimposed by a plurality of kinds of noise for filling, such that an image shown as a rightmost of FIG. 2 is obtained, wherein the noise includes but is not limited to the Gaussian noise, the salt-and-pepper noise, and the Poisson noise. Finally, the constraint learning is performed on the noised image and the original image, by the abnormal-detection model, to implement the training of the model.

Taking a number of rectangular frames, n=1, as an example, an implementation process of the embodiment is as follows:

Assuming that the original image is I, its length and width are (W, H), and an available area is S. A range of a ratio of the area of the occlusion area to the total area thereof is set to be [s min, s max], and the range of the length-width ratio of the rectangular frame is [r min, r max]. A probability-density function of the Gaussian noise is set to be pg, a probability-density function of the salt-and-pepper noise is set to be ppz, and a probability-density function of the Poisson noise is set to be pp.

Then, an area that needs to be occluded in the original image is Sc=rand (s min, s max) (rand ( ) represents taking a random value within the range), and the length-width ratio of the rectangular frame is rc=rand (r min, r max), from which, the length and the width of the rectangular frame Hc and Wc may be obtained by calculating. a position coordinate, xc=rand (0, W) and yc=rand (0, H), of an upper-left corner of the rectangular frame in the original image is randomly generated. By combining the length and the width, Hc and Wc, of the rectangular frame, a position coordinate of a lower-right corner of the rectangular frame, (xc+Wc, yc+Hc), may be obtained, so far, the occlusion area of the rectangular frame is determined. Pixels in the rectangular frame are filled by randomly selecting the noise, and the probability density of the respective kinds of noise is p=rand (pg, ppz, pp).

In a circumstance that the number of rectangular frames is other values, a like process is conducted, which will not expand here again.

Taking a task of railway-electrical-service detection as an example, a camera collects images of key parts, and whether the images belong to the normal samples or the abnormal samples is determined by the abnormal-detection model. In such scenario, historically-accumulated abnormal data is limited, but there are a large number of normal samples. The resolution of the original image is 2048*2048 px, a ratio of a total area of the occlusion area to the area of the original image is set to 10%, each original image is set to be added with one rectangular frame, and the length-width ratio of the rectangular frame is set to be 1. According to the above process, the occlusion area of the rectangular frame is determined. In the rectangular frame, one of three kinds of noise: the Gaussian noise, the salt-and-pepper noise, and the Poisson noise is randomly selected to add thereto. Then the abnormal-detection model performs learning with respect to the original image and the noised image.

The abnormal-detection task may be understood as a classification task. In order to evaluate a trained abnormal-detection model, the embodiment generates a ROC (Receiver Operating Characteristic) curve, and calculates an area AUC (Area Under Curve) under the ROC curve, wherein the ROC curve may be used to evaluate performance of a classifier under different thresholds. The AUC is an index for evaluating performance of the classification tasks. Experiments show that, compared with the traditional denoising autoencoder, the embodiment may realize an improvement of the performance of more than 10% in terms of the AUC, effectively enhance the generalization ability of the model, and reduce the problem of identity mapping of the model at the same time.

It may be seen that the method for training the abnormal-detection model based on the improved denoising autoencoder provided by the application uses the denoising autoencoder for the abnormal-detection task, improves the denoising autoencoder, partially occludes the original image and fills a plurality of kinds of random noise therein, and force the model to learn the global information of the image, so as to alleviate the problem of identity mapping, which may use data of the normal samples to detect the abnormal data to a greater extent. That is to say, differences between the improved denoising autoencoder in the disclosure and the traditional denoising autoencoder in prior are embodied in the above training methods. The denoising autoencoder is well known in prior art, which is not illustrated in detail.

It may be seen that, in a process of training the abnormal-detection model according to the method, on the one hand, a rectangular frame is added in the original image to form a partial occlusion, to force the model to more comprehensively learn global information of the image, rather than local information thereof; on the other hand, randomly adding noise in the rectangular frame may avoid drawbacks produced by a single noise, which may make the model stereotypically learn a denoising method in a patterned way during the learning process, so as to improve the generalization ability of the model. In a word, the method applies a regularization effect on data from two aspects of a local occlusion and adding noise, and forces the model to more comprehensively learn global features of an image during training, to realize de-occlusion and denoising. A more complex learning task helps to alleviate a problem of identity mapping, which improves performance of the abnormal detection of the model.

The embodiment may be integrated into an existing abnormal-detection method without changing architectures of existing algorithm models, thereby effectively improving the performance of the models.

The following introduces the apparatus for training the abnormal-detection model based on the improved denoising autoencoder provided by the application. The following apparatus for training the abnormal-detection model based on the improved denoising autoencoder and the above method for training the abnormal-detection model based on the improved denoising autoencoder may refer to each other correspondingly.

Figure 3:
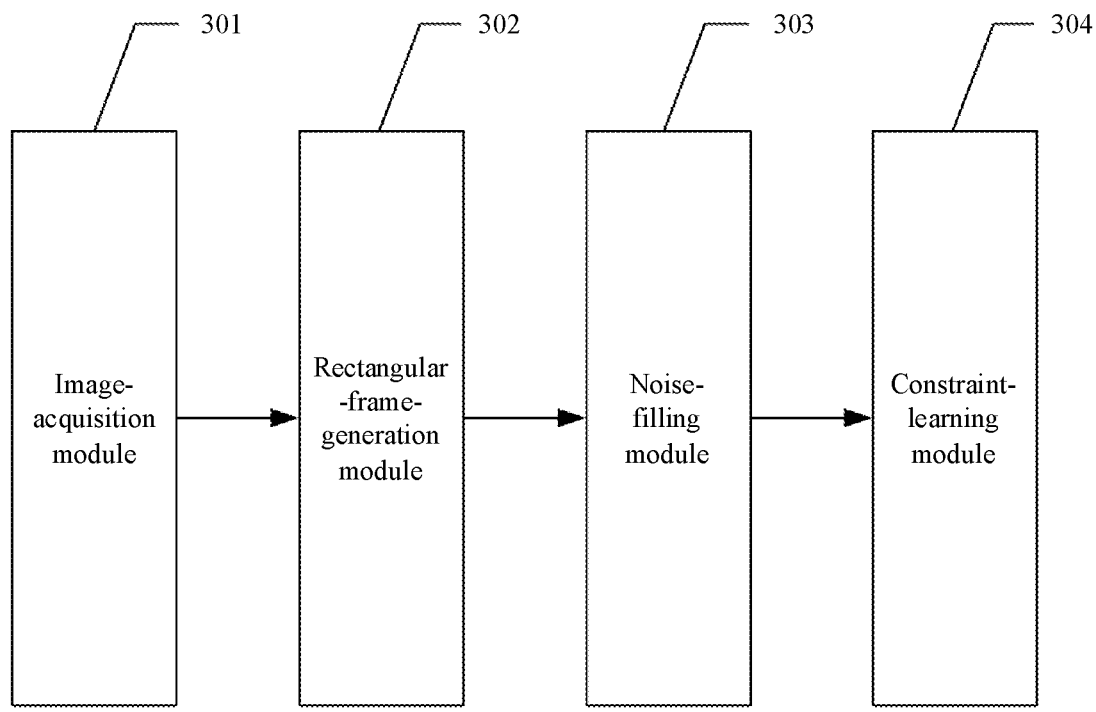
FIG. 3 is a block diagram of functions of an embodiment of an apparatus for training an abnormal-detection model based on an improved denoising autoencoder provided by the application.

The apparatus for training the abnormal-detection model based on the improved denoising autoencoder of the embodiment, as shown in FIG. 3, includes:

An image-acquisition module 301, configured to acquire an original image.

A rectangular-frame-generation module 302, configured to generate a rectangular frame according to a preset range of a resolution ratio, by the improved denoising autoencoder, and occlude the original image by the rectangular frame, wherein the resolution ratio is a ratio of a resolution of an occlusion area formed by the rectangular frame to a resolution of the original image.

A noise-filling module 303, configure to fill random noise in the rectangular frame by the improved denoising autoencoder, to obtain a noised image.

A constraint-learning module 304, configured to perform constraint learning on the original image and the noised image, by the abnormal-detection model, to implement training of the abnormal-detection model.

The apparatus for training the abnormal-detection model based on the improved denoising autoencoder in the embodiment is used to implement the aforementioned method for training the abnormal-detection model based on the improved denoising autoencoder. Therefore, concrete implementations of the apparatus may be found in embodiment parts of the method for training the abnormal-detection model based on the improved denoising autoencoder in the above text. For example, the image-acquisition module 301, the rectangular-frame-generation module 302, the noise-filling module 303, and the constraint-learning module 304 are respectively used to realize the steps S101, S102, S103, S104 in the above-mentioned method for training the abnormal-detection model based on the improved denoising autoencoder. Therefore, the concrete implementations of the apparatus may be referred to descriptions of the corresponding respective embodiment parts, which will not expand here again.

In addition, the apparatus for training the abnormal-detection model based on the improved denoising autoencoder in the embodiment is used to implement the aforementioned method for training the abnormal-detection model based on the improved denoising autoencoder, functions of which correspond to that of the above method, so it will not be repeated here.

Figure 4:
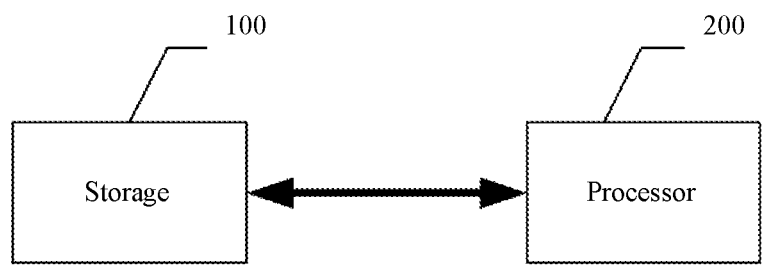
FIG. 4 is a structural diagram of an embodiment of a device for training an abnormal-detection model based on an improved denoising autoencoder provided by the application.

In addition, the present application further provides a device for training an abnormal-detection model based on an improved denoising autoencoder provided by the application, as shown in FIG. 4, including:

A storage 100, configured to store a computer program.

A processor 200, configured to execute the computer program, to implement the aforementioned method for training the abnormal-detection model based on the improved denoising autoencoder.

Finally, the present application further provides a readable storage medium, on which a computer program is stored, and in response to that the computer program is executed by a processor, the processor implements the aforementioned method for training the abnormal-detection model based on the improved denoising autoencoder.

The respective embodiments in the specification are described in a progressive manner, each embodiment focuses on differences from other embodiments, and the same or like parts among the respective embodiments may be referred to each other. As for the apparatus or device disclosed in the embodiments, since it corresponds to the method disclosed in the embodiments, descriptions thereof are relatively simple, and relevant parts thereof may be referred to descriptions of parts of the method.

The steps of the methods or algorithms described in combination with the embodiments disclosed herein may be directly implemented in hardware, software modules executed by a processor, or a combination of the two. The software modules may be placed in random an access memory (RAM), an internal memory, a read only memory (ROM), an electrically programmable ROM, an electrically erasable programmable ROM, a register, a hard disk, a removable disk, a CD-ROM, or a storage medium in any other form well known in the technical field.

The above has introduced the solutions provided by the application in detail, and concrete examples are used to illustrate the principles and implementations of the application. The descriptions of the above embodiments are merely used to help understand the methods and core ideas of this application. For those ordinary skilled in the art, according to the idea of the application, there will be changes in the concrete embodiments and application scope. To sum up, the content of this specification should not be construed as a limit to the application.

The invention claimed is:

1. A method for training an abnormal-detection model based on an improved denoising autoencoder, comprising:
   acquiring an original image;
   generating a rectangular frame according to a preset range of a resolution ratio, by the improved denoising autoencoder, and occluding the original image by the rectangular frame, wherein the resolution ratio is a ratio of a resolution of an occlusion area formed by the rectangular frame to a resolution of the original image;
   filling random noise in the rectangular frame to obtain a noised image, by the improved denoising autoencoder; and
   performing constraint learning on the original image and the noised image, by the abnormal-detection model, to implement training of the abnormal-detection model.

2. The method according to claim 1, wherein the generating the rectangular frame according to the preset range of the resolution ratio, by the improved denoising autoencoder, comprises:
   randomly generating a target resolution ratio within the preset range of the resolution ratio; and
   generating the rectangular frame according to the target resolution ratio, by the denoising autoencoder.

3. The method according to claim 1, wherein the generating the rectangular frame according to the preset range of the resolution ratio, by the improved denoising autoencoder, comprises:
   generating a random number of the rectangular frames according to the preset range of the resolution ratio, by the improved denoising autoencoder.

4. The method according to claim 1, wherein the generating the rectangular frame according to the preset range of the resolution ratio, by the improved denoising autoencoder, comprises:
   within a preset range of a length-width ratio of the rectangular frame, randomly generating a target length-width ratio; and
   generating the rectangular frame whose length-width ratio is the target length-width ratio, according to the preset range of the resolution ratio, by the improved denoising autoencoder.

5. The method of claim 1, wherein the occluding the original image by the rectangular frame, comprises:
   randomly determining a position coordinate of the rectangular frame in the original image; and
   occluding the original image according to the position coordinate, by the rectangular frame.

6. The method according to claim 1, wherein the filling the random noise in the rectangular frame by the improved denoising autoencoder, comprises:

filling the random noise in the rectangular frame according to a preset probability density of the random noise, by the improved denoising autoencoder.

7. The method of claim 1, wherein
the random noise comprises any one item or more items of following: Gaussian noise, salt-and-pepper noise, Poisson noise, and Laplace noise.

8. A device for training an abnormal-detection model based on an improved denoising autoencoder, comprising:
a storage, configured to store a computer program; and
a processor, configured to execute the computer program, to implement the method for training the abnormal-detection model based on the improved denoising autoencoder according to claim 1.

9. A non-transitory readable storage medium, on which a computer program is stored, wherein, in response to that the computer program is executed by a processor, the processor implements the method for training the abnormal-detection model based on the improved denoising autoencoder according to claims 1.

10. The method according to claim 1, wherein the resolution is a display resolution.

11. The method according to claim 1, wherein the ratio of the resolution of the occlusion area formed by the rectangular frame to the resolution of the original image equals a ratio of an area of the occlusion area formed by the rectangular frame to an area of the original image.

12. The method according to claim 4, wherein the length-width ratios of the respective rectangular frames generated during different generation processes of the rectangular frames are different.

13. The method according to claim 4, wherein the length-width ratios of the respective rectangular frames generated during a same generation process of the rectangular frame are different.

14. The method according to claim 4, wherein the length-width ratios of the respective rectangular frames during a same generation process of the rectangular frame are the same, and the length-width ratios of the respective rectangular frames during different generation processes of the rectangular frames are different.

15. The method according to claim 1, wherein the rectangular frame is determined according to one or more of random manners, and the random manners comprise:
the resolution ratio is random;
a number of the rectangular frame is random;
a length-width ratio of the rectangular frame is random; and
a position coordinate of the rectangular frame in the original image is random.

16. The method according to claim 1, wherein pixel points in the rectangular frame are set to black, white or gray.

17. The method according to claim 7, wherein, in response to that the random noise comprises two items or more items of following: the Gaussian noise, the salt-and-pepper noise, the Poisson noise, and the Laplace noise, the two items or more items are superimposed in the rectangular frame.

18. The method according to claim 1, wherein the original image is selected from normal images or abnormal images.

19. The method according to claim 1, wherein the preset range is 10%-20%.

20. The method according to claim 1, wherein the rectangular frame acts as a local occlusion to force the abnormal-detection model to comprehensively learn global information of the noised image, and to make the abnormal-detection model stereotypically learn a denoising method in a patterned way during a learning process.

* * * * *